United States Patent
Matsumura et al.

(10) Patent No.: US 12,048,004 B2
(45) Date of Patent: Jul. 23, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 392 days.

(21) Appl. No.: 17/426,410

(22) PCT Filed: Feb. 1, 2019

(86) PCT No.: PCT/JP2019/003673
§ 371 (c)(1),
(2) Date: Jul. 28, 2021

(87) PCT Pub. No.: WO2020/157966
PCT Pub. Date: Aug. 6, 2020

(65) Prior Publication Data
US 2022/0104254 A1  Mar. 31, 2022

(51) Int. Cl.
*H04W 74/0808* (2024.01)
*H04L 5/00* (2006.01)
(Continued)

(52) U.S. Cl.
CPC ....... *H04W 74/0808* (2013.01); *H04L 5/0051* (2013.01); *H04W 72/21* (2023.01); *H04W 76/12* (2018.02)

(58) Field of Classification Search
CPC . H04W 74/0808; H04W 72/21; H04W 76/12; H04W 74/0833; H04W 76/10; H04L 5/0051; H04L 27/20
See application file for complete search history.

(56) References Cited

U.S. PATENT DOCUMENTS

2004/0235508 A1* 11/2004 Uchida ............... H04W 28/22
455/512
2018/0132223 A1   5/2018 Sankar et al.
(Continued)

FOREIGN PATENT DOCUMENTS

EP          3567915 A1 * 11/2019  .......... H04J 13/0062
WO   WO-2020143591 A1 *  7/2020  ....... H04L 25/03012

OTHER PUBLICATIONS

Extended European Search Report issued in counterpart European Patent Application No. 19913128.5.6, mailed on Aug. 12, 2022 (12 pages).

(Continued)

*Primary Examiner* — Sudesh M Patidar
(74) *Attorney, Agent, or Firm* — Osha Bergman Watanabe & Burton LLP

(57) ABSTRACT

A user terminal according to one aspect of the present disclosure includes a transmitting section that transmits a demodulation reference signal (DMRS) based on π/2-BPSK modulation in uplink transmission of at least one of an uplink shared channel and an uplink control channel, before radio resource control (RRC) connection establishment, and a control section that performs the RRC connection establishment, based on the uplink transmission. According to an aspect of the present disclosure, it is possible to appropriately perform uplink transmission employing π/2-BPSK modulation.

6 Claims, 13 Drawing Sheets

(51) Int. Cl.
*H04W 72/21* (2023.01)
*H04W 76/12* (2018.01)

(56) References Cited

U.S. PATENT DOCUMENTS

| | | | |
|---|---|---|---|
| 2018/0132282 A1 | 5/2018 | Ly et al. | |
| 2018/0198646 A1 | 7/2018 | Gau et al. | |
| 2019/0149298 A1* | 5/2019 | Yang | H04B 7/0456 370/336 |
| 2020/0076670 A1* | 3/2020 | Liu | H04L 27/20 |
| 2021/0259009 A1* | 8/2021 | Chen | H04B 1/713 |
| 2021/0328842 A1* | 10/2021 | Liu | H04J 13/0062 |
| 2022/0085937 A1* | 3/2022 | Gao | H04L 27/2614 |

OTHER PUBLICATIONS

WI rapporteur (Ericsson); "RAN1 agreements for Rel-13 NB-IoT"; 3GPP TSG-RAN WG1 Meeting #84bis, R1-163943; Busan, Korea; Apr. 11-15, 2016 (28 pages).

Office Action issued in the counterpart Japanese Patent Application No. 2020-569318, mailed on Nov. 22, 2022 (6 pages).

Ericsson; "Feature lead summary of low PAPR RS"; 3GPP TSG RAN WG1 Meeting Ad-Hoc Meeting 1901, R1-1901293; Taipei, Taiwan; Jan. 21-25, 2019 (21 pages).

NEC; "Discussion on low PAPR RS"; 3GPP TSG RAN WG1 Ad-Hoc Meeting 1901, R1-1900673; Taipei, China; Jan. 21-25, 2019 (7 pages).

Nokia, Nokia Shanghai Bell; "On the remaining details of long PUCCH for UCI more than 2 bits"; 3GPP TSG RAN WG1 #91, R1-1720011; Reno, Nevada, USA; Nov. 27-Dec. 1, 2017 (12 pages).

Samsung; "UE features"; 3GPP TSG RAN WG1 Meeting #92bis, R1-1804388; Sanya, China; Apr. 16-20, 2018 (7 pages).

Extended European Search Report issued in counterpart European Patent Application No. 19913128.5, mailed on Aug. 12, 2022 (12 pages).

International Search Report issued in PCT/JP2019/003673 on Mar. 26, 2019 (1 page).

Written Opinion of the International Searching Authority issued in PCT/JP2019/003673 on Mar. 26, 2019 (4 pages).

Ericsson; "Notes from low PAPR RS offline discussion"; 3GPP TSG RAN WG1 Meeting Ad-Hoc Meeting 1901, R1-1901386; Taipei, Taiwan; Jan. 21-25, 2019 (7 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in Chinese Application No. 201980091067.1; Dated Sep. 28, 2023 (13 pages).

\* cited by examiner

| PUCCH TIME LENGTH | OCC MULTIPLEXING CAPACITY N | |
|---|---|---|
| | WITH HOPPING | WITHOUT HOPPING |
| 4 | 1 | 2 |
| 5 | 1 | 2 |
| 6 | 1 | 3 |
| 7 | 1 | 3 |
| 8 | 2 | 4 |
| 9 | 2 | 4 |
| 10 | 2 | 5 |
| 11 | 2 | 5 |
| 12 | 3 | 6 |
| 13 | 3 | 6 |
| 14 | 3 | 7 |

FIG. 9

USER TERMINAL AND RADIO COMMUNICATION METHOD

TECHNICAL FIELD

The present disclosure relates to a user terminal and a radio communication method in next-generation mobile communication systems.

BACKGROUND ART

In Universal Mobile Telecommunications System (UMTS) networks, the specifications of Long Term Evolution (LTE) have been drafted for the purpose of further increasing high speed data rates, providing lower latency, and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G))," "5G+(plus)," "New Radio (NR)," "3GPP Rel. 15 (or later versions)," and so on) are also under study.

In existing LTE systems (for example, LTE Rel. 8 to Rel. 14), a user terminal (UE (User Equipment)) controls transmission of an uplink shared channel (Physical Uplink Shared Channel (PUSCH)), based on downlink control information (DCI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems, uplink transmission employing π/2-Binary Phase Shift Keying (BPSK) modulation for enabling a low peak-to-average power ratio (PAPR) is under study.

However, when uplink transmission employing π/2-BPSK modulation and uplink transmission not employing π/2-BPSK modulation coexist, this prevents performance from being improved sufficiently in some cases.

Thus, an object of the present disclosure is to provide a user terminal and a radio communication method that appropriately perform uplink transmission employing π/2-BPSK modulation.

Solution to Problem

A user terminal according to one aspect of the present disclosure includes a transmitting section that transmits a demodulation reference signal (DMRS) based on π/2-BPSK modulation in uplink transmission of at least one of an uplink shared channel and an uplink control channel, before radio resource control (RRC) connection establishment, and a control section that performs the RRC connection establishment, based on the uplink transmission.

Advantageous Effects of Invention

According to an aspect of the present disclosure, it is possible to appropriately perform uplink transmission employing π/2-BPSK modulation.

BRIEF DESCRIPTION OF DRAWINGS

FIG. 1 is a diagram to show an example of a binary CGS having a length of 12;
FIG. 2 is a diagram to show an example of a binary CGS having a length of 18;
FIG. 3 is a diagram to show an example of a binary CGS having a length of 24;
FIG. 9 is a diagram to show an example of time domain OCC multiplexing capacities.

DESCRIPTION OF EMBODIMENTS

Figure 4:
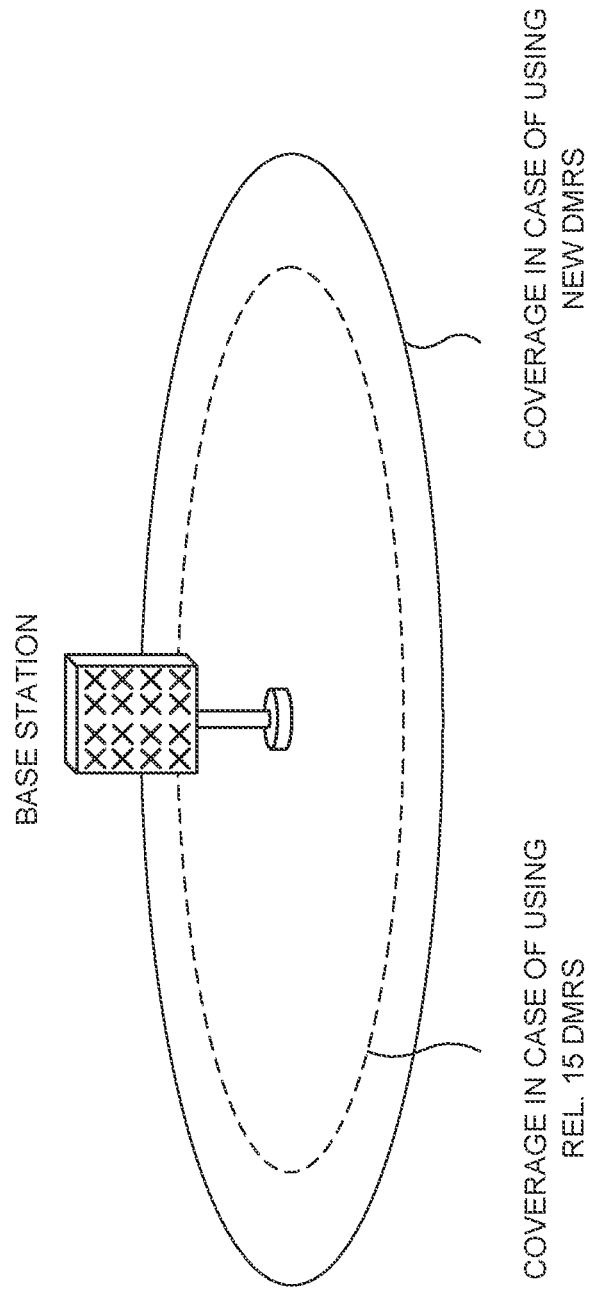
FIG. 4 is a diagram to show an example of a difference in coverage based on DMRSs.

For DMRS configuration type, a UE may determine a DL (UL) DMRS to have type 2 in a case that an RRC information element ("dmrs-Type" information element) is configured for DL (UL) and to have type 1 in a case that no RRC information element is configured for DL (UL), for example.

In DMRS configuration type 1, a mapped DMRS has comb-like (comb-tooth-like) configuration in the frequency direction. One comb is the DMRS, and the other comb is null. In a null resource, nothing may be transmitted, or data may be transmitted. In other words, in DMRS configuration type 1, six REs may be used as the DMRS per PRB and per port.

In DMRS configuration type 2, four REs may be mapped per PRB and per port, for example. Note that, the DMRS configuration type may be configured such that the above-described two types are defined in specifications, or three or more types may be defined in specifications.

For future radio communication systems (for example, Rel. 16 or later versions), a reference signal (RS) for enabling a low peak-to-average power ratio (PAPR) is under study.

(DMRS for CP-OFDM)

Extension of a DMRS is under study for a Physical Downlink Shared Channel (PDSCH) Demodulation (DM) RS and a Physical Uplink Shared Channel (PUSCH) DMRS in Cyclic Prefix (CP)-Orthogonal Frequency Division Multiplex (OFDM), to have a reduced PAPR in the same level as that of data symbols for combinations of all the ports defined in specifications.

In extension of a DMRS in Rel. 16, different initial values $C_{init}$ may be configured for respective Code Division Multiplexing (CDM) groups.

For type 1, two $C_{init}$ may be configured by scrambling ID $n_{SCID}$=0, 1. $n_{SCID}$=may be given by a DMRS initialization field in DCI scheduling a PUSCH or a PDSCH. The two $C_{init}$ may be used for respective ports of two CDM groups.

For type 2, CDM group indices may be introduced for $C_{init}$.

For type 1 and type 2, dynamic transmission/reception point (TRP) selection or Multi-User (MU)-Multiple Input Multiple Output (MIMO) associating (paring) with different $n_{SCID}$, and CDM group-specific $C_{init}$ may be supported at the same time.

In extension of a DMRS, the following solutions may be excluded.

Change of Orthogonal Cover Code (OCC)

Generation of Pseudo Noise (PN) sequence such as sub-sampling of longer sequence For extension of a DMRS, an issue of backward compatibility and the total number of $c_{init}$ configured for each UE are considered carefully.

The extension may be carried out so that a Radio Resource Control (RRC) parameter (DMRS-DownlinkConfig and DMRS-UplinkConfig) configures selective use of a sequence in Rel. 16 and an operation for second and third CDM groups for each of a PDSCH and a PUSCH and only CP-OFDM. Downlink Control Information (DCI) need not necessarily be used for selection between an operation based on Rel. 15 and an operation in Rel. 16.

In Rel. 15, a UE generates a pseudo-random sequence r(n), which is a Gold sequence having a length of 31, according to equation (1) below.

[Math. 1]

$$r(n) = \frac{1}{\sqrt{2}}(1 - 2 \cdot c(2n)) + j\frac{1}{\sqrt{2}}(1 - 2 \cdot c(2n+1)) \quad \text{Equation (1)}$$

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

$$x_1(0) = 1, x_1(n) = 0, n = 1, 2, \ldots, 30$$

$$c_{init} = \sum_{i=0}^{30} x_2(i) \cdot 2^i$$

Here, $M_{PN}$ denotes the length of r(n) where n=0, 1, ..., $M_{PN}$−1 and $N_C$=1600, a first m sequence $x_1(n)$ is initialized with x1(n)=1, x1(n)=0, and n=1, 2, ..., 30, and a second m sequence $x_2(n)$ is initialized with $c_{init}$.

A DMRS sequence for a PUSCH to be subjected to CP-OFDM is given by r(n) in equation (1), and a generator of the pseudo-random sequence c(i) is initialized with $c_{init}$ in equation (2) below.

[Math. 2]

$$c_{init} = \left(2^{17}\left(N_{symb}^{slot}n_{s,f}^{\mu} + l + 1\right)\left(2N_{ID}^{nSCID} + 1\right) + 2N_{ID}^{nSCID} + n_{SCID}\right) \bmod 2^{31} \quad \text{Equation (2)}$$

Here, l denotes the number of OFDM symbols in a slot, and $n_{s,f}^{\mu}$ denotes the number of slots in a frame. $N_{ID}^{0}$ may be given by a higher layer parameter (scrambling ID0), $N_{ID}^{1}$ may be given by a higher layer parameter (scrambling ID1), or $N_{ID}^{nSCID}$ may be $N_{ID}^{cell}$. For $n_{SCID}$, 0 or 1 may be indicated by a DM-RS initialization field, or $n_{SCID}$ may be 0.

As described above, a PUSCH DMRS in Rel. 15 is based on Quadrature Phase Shift Keying (QPSK) modulation.

In Rel. 16, $c_{init}$ below for CDM group λ may be used for a DMRS for both DMRS configuration types 1 and 2.

[Math. 3]

$$c_{init}(\lambda) = \quad \text{Equation (3)}$$
$$\left(2^{17}\left(N_{symb}^{slot}n_{s,f}^{\mu} + l + 1\right)\left(2N_{ID}^{nSCID(\lambda)} + 1\right) + 2N_{ID}^{nSCID(\lambda)} + n'_{SCID}(\lambda) + 2^{17}\left\lfloor\frac{\lambda}{2}\right\rfloor\right) \bmod 2^{31}$$

Where
$$n'_{SCID}(\lambda = 0) = n_{SCID}$$
$$n'_{SCID}(\lambda = 1) = 1 - n_{SCID}$$
$$n'_{SCID}(\lambda = 2) = n_{SCID}$$

Here, $n_{SCID}$ may be provided by DCI (for example, the DM-RS initialization field). λ may indicate an absolute CDM group index.

With such a new DMRS, it is possible to reduce the PAPR compared with a case with a Rel. 15 DMRS.

(DMRS for DFT-S-OFDM)

In Rel. 15, a PUSCH DMRS sequence for DFT-S-OFDM is a Constant Amplitude Zero Auto-Correlation (CAZAC) sequence or a sequence corresponding to a CAZAC sequence. For example, in a case that a sequence length is longer than 36, the PUSCH DMRS sequence is a Zadoff-Chu sequence or a sequence obtained by cyclic-shifting a Zadoff-Chu sequence. In a case that the sequence length is 36 or shorter, the PUSCH DMRS sequence is a Computer Generated Sequence (CGS), and this CGS sequence is generated based on QPSK modulation. In contrast, as a DMRS sequence for π (pi)/2-Binary Phase Shift Keying (BPSK) modulation for both a PDSCH and a PUSCH for Discrete Fourier Transform (DFT)-spread(S)-OFDM, NR Rel. 16 may support a binary CGS subjected to π/2-BPSK modulation and DFT for a length of 12, 18, and 24. This sequence may be applied to a single-symbol DMRS configuration.

Figure 1:
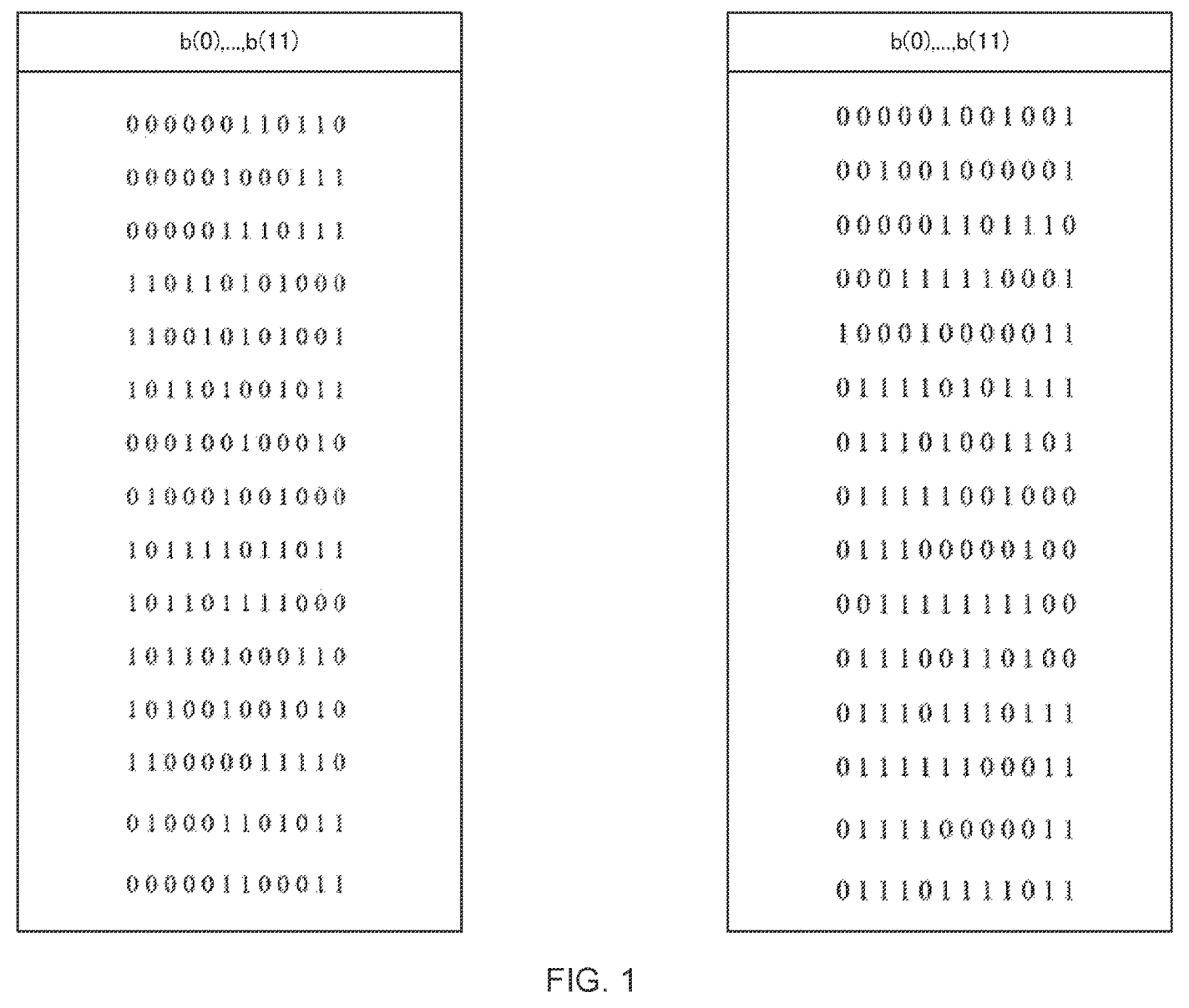
Figure 2:
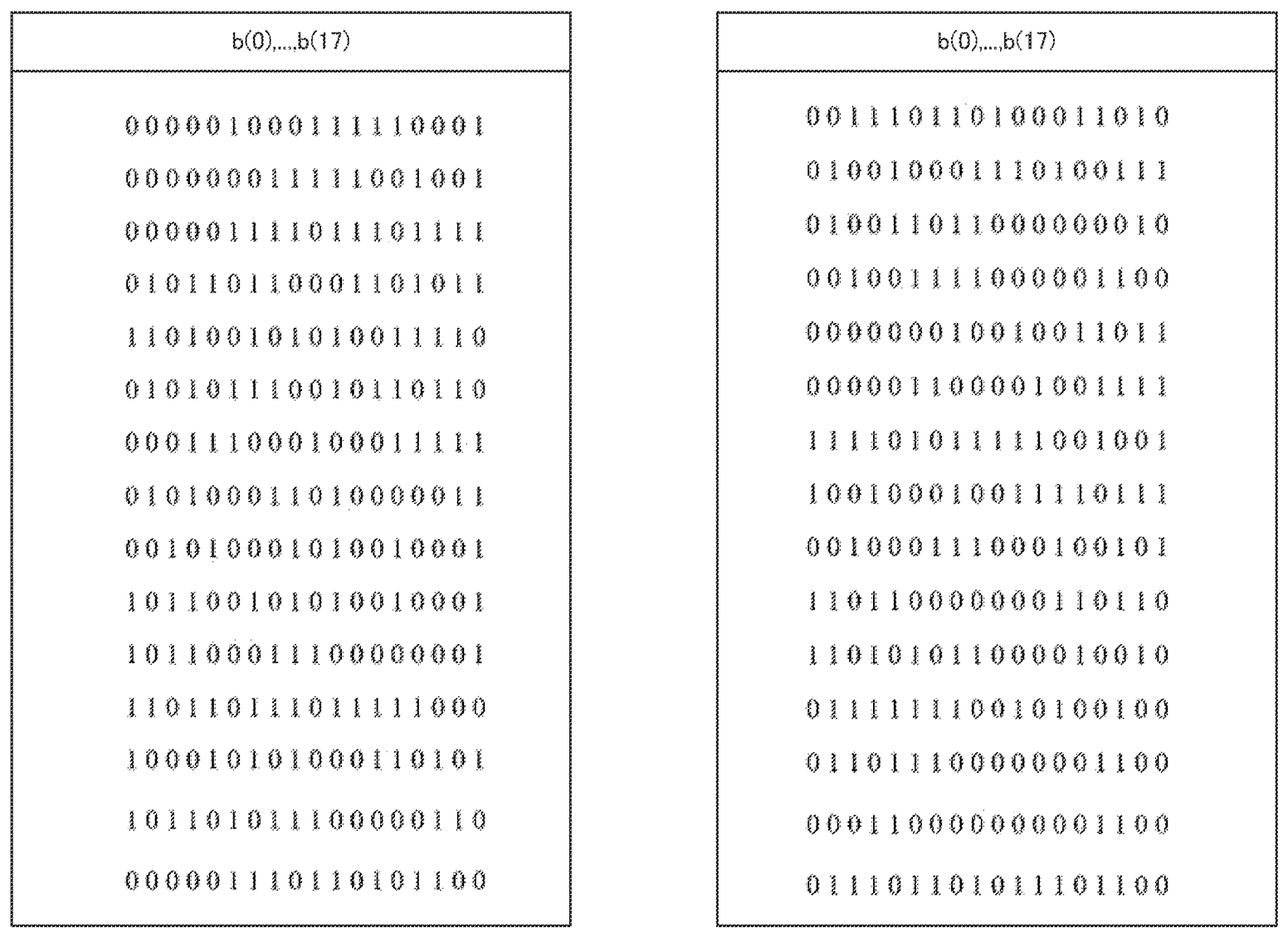
Figure 3:
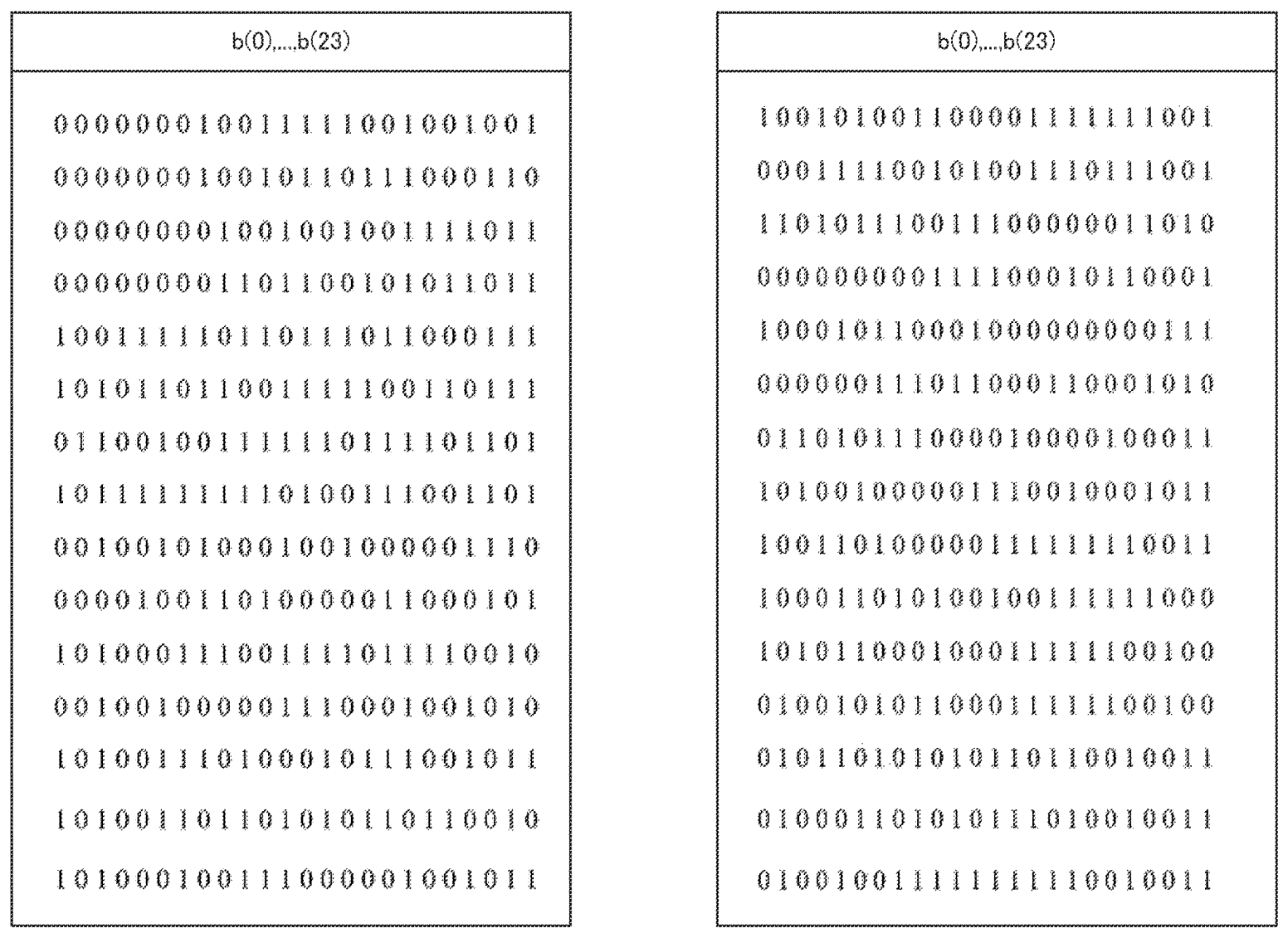

FIG. 1 shows an example of a binary CGS of a length of 12, FIG. 2 shows an example of a binary CGS of a length of 18, and FIG. 3 shows an example of a binary CGS of a length of 24.

π/2-BPSK (π/2 shift BPSK) is a BPSK causing a phase to shift by π/2 of a phase for each one data symbol.

Designing of a Rel. 16 sequence for π/2-BPSK for a PUSCH DMRS having a length of 30 or more is studied.

A cell ID may be used as a default scrambling parameter. A Rel. 16 sequence may use an equation for $C_{init}$ for a DMRS for CP-OFDM in Rel. 15 and reuse a generator of a Gold sequence in Rel. 15.

Options 1 and 2 below are studied.
(Option 1)

A Rel. 16 sequence follows a DFT-S-OFDM approach. $n_{ID}^{nSCID}$ may be defined as a higher layer parameter (for DFT-S-OFDM PUSCH, nPUSCH-Identity). Only $n_{SCID}$=0 may be applicable. For the Rel. 16 sequence, no change may be made by DCI, and only RRC signaling may be used for configuration.

(Option 2)

A Rel. 16 sequence follows a CP-OFDM approach. $n_{ID}^{nSCID}$ may be configured by RRC signaling for CP-OFDM DMRS. DCI may be used to indicate that $n_{SCID}$ is for CP-OFDM. In a case that a Rel. 16 DMRS is configured, one bit may constantly exist in DCI. gNB can dynamically select a sequence to reduce the probability of selecting a wrong sequence.

With such a new DMRS, it is possible to reduce the PAPR compared with a case with a Rel. 15 DMRS.

(Coverage)

Compared with an existing DMRS based on QPSK modulation in Rel. 15, a new DMRS based on π/2-BPSK modulation has a low PAPR. A CP-OFDM DMRS sequence in Rel. 16 has a lower PAPR than that of a CP-OFDM DMRS sequence in Rel. 15. A DFT-S-OFDM DMRS sequence in Rel. 16 has a lower PAPR than that of a DFT-S-OFDM DMRS sequence in Rel. 15. Thus, by using such a new DMRS for at least one of DFT-S-OFDM and CP-OFDM in Rel. 16, this can improve UL channel quality compared with that of Rel. 15. As shown in FIG. 4, to improve (expand) a coverage in Rel. 16 compared with that in Rel. 15, a new DMRS is preferably supported before RRC connection setup (or establishment) as well.

However, in a case that functions of Rel. 15 are mandatory and functions of Rel. 16 are optional, a NW cannot find out, before RRC connection establishment with a UE (reception of UE capability information), whether the UE supports functions of Rel. 16 (whether the UE is Rel. 15 UE or Rel. 16 UE).

Even in a case that a coverage obtained by the new DMRS in Rel. 16 is larger than a coverage of Rel. 15, the coverage of Rel. 16 is limited to the coverage of Rel. 15 by using functions of Rel. 15 before RRC connection.

In view of this, the inventors of the present invention came up with the idea of using π/2-BPSK before RRC connection establishment.

In the present disclosure, for example, a higher layer signaling may be any one or combinations of Radio Resource Control (RRC) signaling, Medium Access Control (MAC) signaling, broadcast information, and the like.

For example, the MAC signaling may use MAC control elements (MAC CEs), MAC Protocol Data Units (PDUs), and the like. For example, the broadcast information may be master information blocks (MIBs), system information blocks (SIBs), minimum system information (Remaining Minimum System Information (RMSI)), other system information (OSI), and the like.

For example, a physical layer signaling may be downlink control information (DCI).

In the present disclosure, Rel. 16 may be interpreted as a particular resource in Rel. 16 or later versions.

In the present disclosure, a case that DFT-S-OFDM is applied, a case that transform precoding (TP) is enabled (applied), and a case that a transmission waveform is of DFT-S-OFDM may be interpreted interchangeably. A case that CP-OFDM is employed, a case that TP is disabled (not applied), and a case that a transmission waveform is of CP-OFDM may be interpreted interchangeably.

In the present disclosure, data, an uplink (UL)-shared channel (SCH), uplink control information (UCI), and a data symbol may be interpreted interchangeably.

In the present disclosure, a UL DMRS, a DMRS for PUSCH (PUSCH DMRS), and a DMRS for PUCCH (PUCCH DMRS) may be interpreted interchangeably. A first DMRS, a DMRS based on QPSK modulation, a PUSCH DMRS in Rel. 15, a PUCCH DMRS, an existing DMRS, and a first reference signal sequence may be interpreted interchangeably. A second DMRS, a DMRS based on π/2-BPSK modulation, a PUSCH DMRS in Rel. 16, a PUCCH DMRS in Rel. 16, a new DMRS, and a second reference signal sequence may be interpreted interchangeably.

In the present disclosure, Msg. 1, a random access channel (RACH), and a physical random access channel (PRACH) may be interpreted interchangeably.

In the present disclosure, Msg. 2, a RAR, Msg. 2 DCI, a Msg. 2 PDCCH, a Msg. 2 PDSCH, a PDSCH carrying a RAR, and DCI scheduling a RAR may be interpreted interchangeably.

In the present disclosure, Msg. 3, a Msg. 3 PUSCH, a PUSCH scheduled by a random access response (RAR), and a PUSCH scheduled by a RAR UL grant may be interpreted interchangeably.

Embodiments according to the present disclosure will be described in detail with reference to the drawings as follows. The radio communication method according to each embodiment may be employed independently or may be employed in combination.

(Radio Communication Method)

Embodiment 1

A UE having a particular capability may support a first reference signal sequence generation method (first reference signal sequence or first DMRS) and a second reference signal sequence generation method (second reference signal sequence or second DMRS). The particular capability may be a capability of Rel. 16 (capability other than that of Rel. 15).

A first DMRS sequence generation method may generate a first reference signal sequence. The first reference signal sequence may be a reference signal sequence based on QPSK (for example, a reference signal sequence to be used for a DMRS in Rel. 15 or a reference signal sequence based on equation (1) and equation (2)).

A second reference signal sequence generation method may generate a second reference signal sequence. The second reference signal sequence may be a reference signal sequence to be used for a DMRS in Rel. 16. The second reference signal sequence may be a sequence generated by employing π/2-BPSK modulation.

In a case of employing CP-OFDM, the second reference signal sequence may be a CP-OFDM DMRS sequence based on π/2-BPSK modulation (for example, a reference signal sequence based on equation (1) and equation (3)).

In a case of employing DFT-S-OFDM, the second reference signal sequence may be a DFT-S-OFDM DMRS sequence (for example, a reference signal sequence based on one of FIGS. 1 to 3).

The UE supporting the second reference signal sequence may be configured whether to use the first reference signal sequence or the second reference signal sequence, by RRC signaling.

According to Embodiment 1 above, by using the second reference signal sequence for a DMRS, the PAPR of the DMRS can be reduced.

Embodiment 2

In a case that a UE applies π/2-BPSK for data in at least one of a PUSCH and a PUCCH using DFT-S-OFDM, the UE preferably applies π/2-BPSK for a DMRS. The DMRS for which π/2-BPSK is applied may be a DMRS using the second reference signal sequence (second DMRS). A DMRS for which π/2-BPSK is not applied may be a DMRS using the first reference signal sequence (first DMRS).

The first reference signal sequence is generated by employing QPSK. Even though the PAPR of data symbols is reduced by performing π/2-BPSK on the data, the PAPR of DMRS symbols is not reduced by applying QPSK for the DMRS, and hence performance is not improved.

In Rel. 15, π/2-BPSK modulation can be applied for data on a PUSCH or a PUCCH only after RRC connection establishment. In a case that DFT-S-OFDM is applied, π/2-BPSK modulation can be enabled by PUSCH configuration information (for example, tp-pi2BPSK in PUSCH-Config) after RRC connection establishment. For this reason, in Rel. 15, π/2-BPSK modulation cannot be employed for a Msg. 3 PUSCH.

PUCCH formats 3 and 4 are used only after RRC connection establishment. The UE can employ π/2-BPSK modulation for UCI symbols in PUCCH formats 3 and 4 by PUCCH configuration information (pi2BPSK in PUCCH-FormatConfig in PUCCH-Config) after RRC connection establishment.

The UE may employ π/2-BPSK modulation before RRC connection establishment. π/2-BPSK modulation may be a function of Rel. 16 before RRC connection establishment.

According to Embodiment 2 above, a coverage of a case employing Rel. 16 can be expanded compared to a coverage of Rel. 15.

Embodiment 3

The UE may report UE capability information related to the second reference signal sequence (second DMRS). The UE capability information may indicate whether or not to support the second reference signal sequence.

The UE capability information may include information related to the length (sequence length) of the second reference signal sequence. In a case that a plurality of sequence lengths of the second reference signal sequence are defined in specifications, the UE capability information may indicate whether or not to support the second reference signal sequence of each sequence length or may indicate a second reference signal sequence(s) of which sequence length(s) is supported.

The UE may be configured (indicated) to use the second reference signal sequence by a network (NW, e.g., a base station).

The UE need not necessarily expect to be configured to use the second reference signal sequence not reported to support. In a case that the UE is configured to use the second reference signal sequence not reported to support by the UE capability information, the UE may use the first reference signal sequence for a DMRS. In a case that the UE is configured to use the second reference signal sequence of a sequence length not reported to support, the UE may use the first reference signal sequence for a DMRS.

For example, in a case that the UE that has reported to support only the second reference signal sequence of a length of 12 is configured to use the second reference signal sequence of a length of 24, the UE may use the first reference signal sequence for a DMRS.

The UE may be configured to use the second reference signal sequence, by RRC signaling. PUSCH configuration information and PUCCH configuration information may include use of the second reference signal sequence.

The UE may be indicated to use the second reference signal sequence, by DCI. The DCI may be DCI for scheduling a PUSCH (UL grant) or may be DCI for scheduling a PDSCH (DL assignment). The UE may be indicated to use the second reference signal sequence, by a specified field in the DCI. The specified field may be a new field or may be a combination of existing fields in the DCI.

The UE that has reported to support the second reference signal sequence may transmit the second DMRS in PUSCH transmission after the report. The UE may transmit the first DMRS in Msg. 3 PUSCH transmission.

Transmitting the first DMRS in Msg. 3 PUSCH transmission can improve, even though the coverage is not improved, quality (for example, the SN ratio) after RRC connection establishment by transmitting the second DMRS after RRC connection establishment.

In a case of applying DFT-S-OFDM on a Msg. 3 PUSCH and applying CP-OFDM on a PUSCH after RRC connection establishment, transmitting the first DMRS in PUSCH transmission after RRC connection establishment increases the PAPR of CP-OFDM and consequently reduces the coverage. Transmitting the second DMRS in PUSCH transmission after RRC connection establishment can suppress an increase in the PAPR and improve the coverage compared with a case of transmitting the first DMRS.

The UE that has reported to support the second reference signal sequence may transmit the second DMRS in PUSCH (including the Msg. 3 PUSCH) transmission. The UE that has reported to support the second reference signal sequence by the UE capability information may transmit the second DMRS in all PUSCH transmissions.

In this way, by the UE reporting to support the second reference signal sequence, it is possible to appropriately control whether to use the second DMRS.

The UE need not necessarily be explicitly configured (may be implicitly configured) to use the second reference signal sequence (second DMRS).

The UE that has reported to support the second reference signal sequence and is configured to use π/2-BPSK for PUSCH transmission may transmit a PUSCH with the second DMRS. The UE that has reported to support the second reference signal sequence and is configured to use π/2-BPSK and DFT-S-OFDM for PUSCH transmission may transmit a PUSCH with the second DMRS.

The UE that has reported to support the second reference signal sequence and is configured to use π/2-BPSK for PUCCH transmission may transmit a PUCCH with the second DMRS. The UE that has reported to support the second reference signal sequence and is configured to use π/2-BPSK and DFT-S-OFDM for PUCCH transmission may transmit a PUCCH with the second DMRS.

The UE that has reported to support the second reference signal sequence and is configured to use π/2-BPSK for PUCCH transmission may transmit a PUSCH with the second DMRS. The UE that has reported to support the second reference signal sequence and is configured to use π/2-BPSK and DFT-S-OFDM for PUCCH transmission may transmit a PUSCH with the second DMRS.

The UE that has reported to support the second reference signal sequence and is configured to use π/2-BPSK for PUCCH transmission may transmit a PUCCH with the second DMRS. The UE that has reported to support the second reference signal sequence and is configured to use π/2-BPSK and DFT-S-OFDM for PUCCH transmission may transmit a PUCCH with the second DMRS.

In this way, by not explicitly configuring to use the second DMRS, the overhead of signaling can be suppressed.

Embodiment 4

The UE may perform at least one of transmission and reception of information related to a second reference signal sequence (second DMRS) in a random access procedure (before RRC connection establishment).

Figure 5:
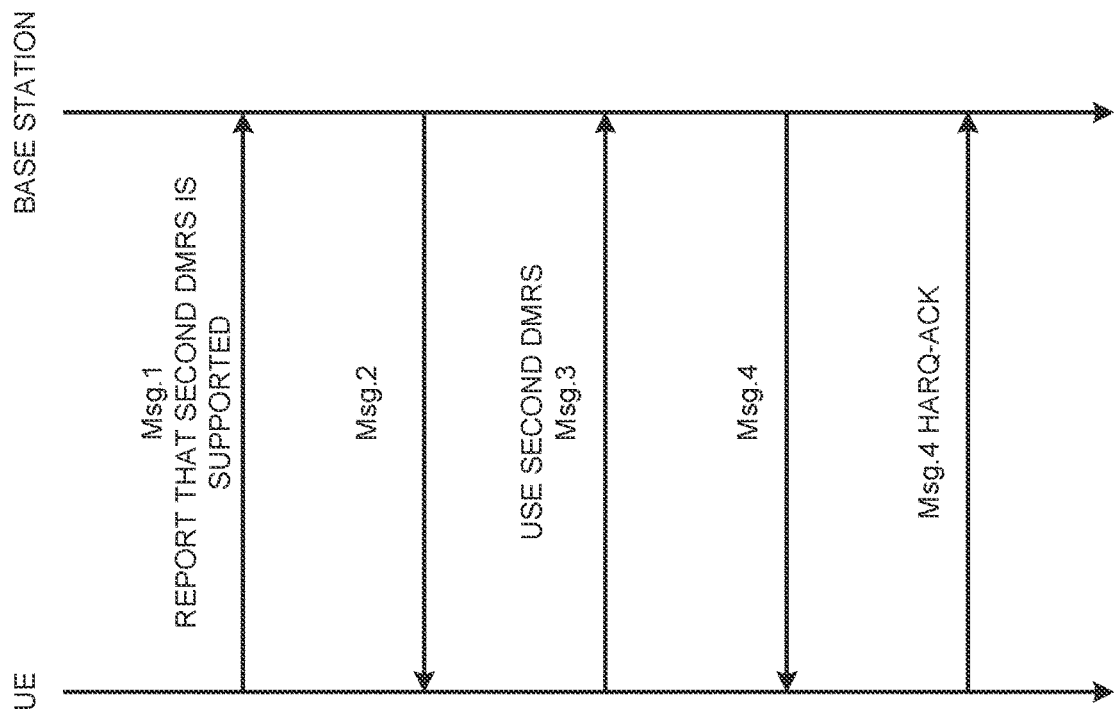
FIG. 5 is a diagram to show an example of an operation of reporting by using Msg. 1 to support a second reference signal sequence.

As shown in FIG. 5, the UE supporting the second reference signal sequence may report to support the second reference signal sequence by Msg. 1.

The UE may determine a first RACH resource (for example, a contention-based preamble or a PRACH occasion) by the following RACH resource determination method, determine a second RACH resource by adding a resource offset to the first RACH resource, and report to support the second reference signal sequence by Msg. 1 using the second RACH resource. The resource offset may be at least one of a preamble (sequence) index, a frequency resource (for example, PRB) index, and a time resource (for example, at least one of slot and symbol) index.

<RACH Resource Determination Method>

The UE is provided with N SS/PBCH blocks associated with one PRACH occasion and R contention-based (contention-based random access) preambles for each SS/PBCH block, by a higher layer parameter (ssb-perRACH-OccasionAndCB-PreamblesPerSSB). In a case that N is smaller than 1, one SS/PBCH block is mapped to 1/N consecutive PRACH occasions. In a case that N is 1 or greater, R contention-based preambles having consecutive indices associated with the SS/PBCH block n (0≤n≤N−1) start from the contention-based preamble having a preamble index n*64/N, for each PRACH occasion. The SS/PBCH block indices are mapped to PRACH occasions in the following order.

Firstly, ascending order of preamble indices in a single PRACH occasion

Secondly, ascending order of frequency resource indices for frequency-multiplexed PRACH occasions Thirdly, ascending order of time resource indices for time-multiplexed PRACH occasions in a PRACH slot Fourthly, ascending order of indices for PRACH slots The UE supporting the second reference signal sequence may interpret a RACH resource configured by the NW by a given method to determine an RACH resource for reporting to support the second reference signal sequence. Whether or not the UE is to transmit a request to transmit the second DMRS (a report of supporting the second reference signal sequence) in Msg. 3 may be indicated to the UE by broadcast information or may depend on the UE (may be dependent on UE implementation).

The UE not supporting the second reference signal sequence may determine a first RACH resource by the above-described RACH resource determination method and report to support the second reference signal sequence by Msg. 1 using the first RACH resource.

The UE that has reported to support the second reference signal sequence by using Msg. 1 may transmit the second DMRS in Msg. 3.

In this way, by the UE reporting to support the second reference signal sequence (second DMRS) by using Msg. 1, it is possible to appropriately control whether or not to transmit the second DMRS before RRC connection establishment.

Figure 6:
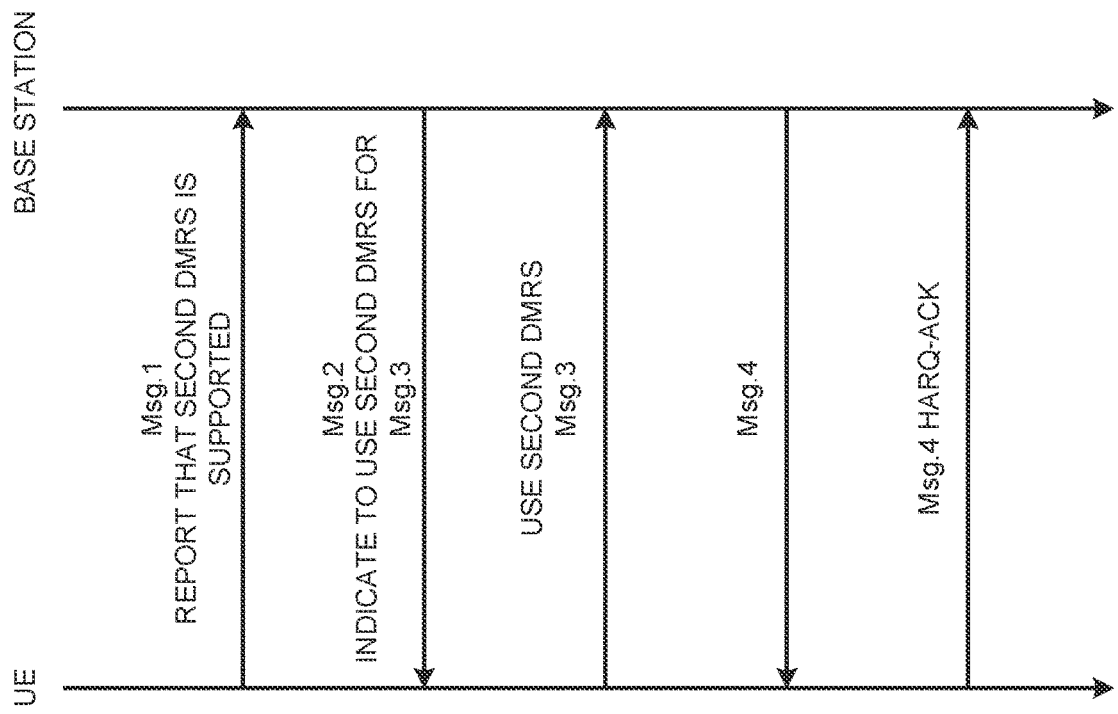
FIG. 6 is a diagram to show an example of an operation of a case of indicating by using Msg. 2 to use a second DMRS.

As shown in FIG. 6, the UE supporting the second reference signal sequence may be configured (indicated) by Msg. 2 to transmit the second DMRS in Msg. 3 PUSCH transmission.

The UE supporting the second reference signal sequence may be indicated by a specified field in Msg. 2 DCI to transmit the second DMRS in Msg. 3 PUSCH transmission. The specified field may be a new field. The new field may be of 1 bit. The specified field may be a combination of existing fields.

The UE supporting the second reference signal sequence may be indicated by at least one of a physical resource and a frequency resource of a Msg. 2 PDCCH to transmit the second DMRS in Msg. 3 PUSCH transmission. For example, either a value of a (first) CCE index/aggregation level of the Msg. 2 PDCCH is an even number or an odd number may be associated with transmission of the second DMRS in Msg. 3 PUSCH transmission. The UE supporting the second reference signal sequence may be indicated, by the value of the (first) CCE index/aggregation level of the Msg. 2 PDCCH being an even number or an odd number, to transmit the second DMRS in Msg. 3 PUSCH transmission.

Whether or not to transmit the second DMRS in Msg. 3 PUSCH transmission may be associated with a search space (ID) or a CORESET (ID) of the Msg. 2 PDCCH. The UE supporting the second reference signal sequence may be indicated by the search space or the CORESET of Msg. 2 PDCCH to transmit the second DMRS in Msg. 3 PUSCH transmission.

The UE supporting the second reference signal sequence may be indicated by the Msg. 2 PDSCH to transmit the second DMRS in Msg. 3 PUSCH transmission. For example, the UE may be indicated by a specified field in the Msg. 2 PDSCH to transmit the second DMRS in Msg. 3 PUSCH transmission. Whether or not to transmit the second DMRS in Msg. 3 PUSCH transmission may be associated with at least one of a Msg. 2 PDSCH resource and a Msg. 2 PDSCH DMRS resource. The UE supporting the second reference signal sequence may be indicated by at least one of the Msg. 2 PDSCH resource and the Msg. 2 PDSCH DMRS resource to transmit the second DMRS in Msg. 3 PUSCH transmission.

In this way, by the UE being indicated by using Msg. 2 to transmit the second DMRS, it is possible to appropriately control whether or not to transmit the second DMRS before RRC connection establishment.

In a case of multiplexing DMRSs from a plurality of UEs, the multiplexing is considered to be performed by at least one of Frequency Division Multiplexing (FDM) (for example, the plurality of UEs use different Combs in DMRS frequency resources), Cyclic Shift (CS) (for example, the plurality of UEs use different CSs for the DMRSs), and time domain OCC (for example, the plurality of UEs use different OCCs for two-symbol DMRSs). Among the possibilities, in a case of employing at least one of CS and time domain OCC, the plurality of UEs transmit DMRSs in the same time resource and frequency resource, and hence all the UEs to be multiplexed need to use only one of the first DMRS and the second DMRS. By indicating the UE supporting the second DMRS to use the first DMRS, multiplexing is possible in the same time resource and frequency resource for the UE not supporting the second DMRS and the UE supporting the second DMRS.

Figure 7:
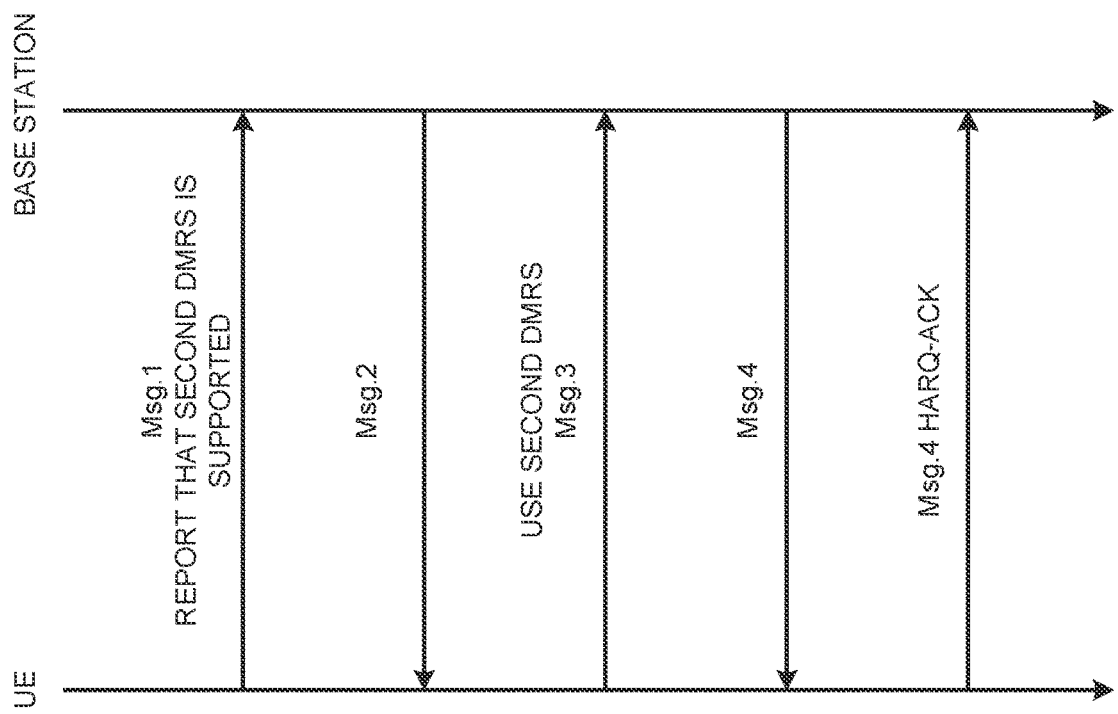
FIG. 7 is a diagram to show an example of an operation of a case of not indicating by using Msg. 2 to use the second DMRS.

As shown in FIG. 7, the UE supporting the second reference signal sequence need not necessarily be configured (indicated) whether or not to transmit the second DMRS in Msg. 3 PUSCH transmission. The UE supporting the second reference signal sequence may transmit the second DMRS in Msg. 3 PUSCH transmission.

The UE supporting the second reference signal sequence may transmit the second DMRS in Msg. 3 PUSCH transmission and subsequently transmit the second DMRS in PUSCH transmission before RRC connection establishment. The UE supporting the second reference signal sequence may transmit the second DMRS in Msg. 3 PUSCH transmission and subsequently transmit the first DMRS in PUSCH transmission before RRC connection establishment.

The UE supporting the second reference signal sequence may transmit the second DMRS in Msg. 3 PUSCH transmission and transmit the second DMRS in PUSCH transmission after RRC connection establishment. In a case that the UE supporting the second reference signal sequence transmits the second DMRS in Msg. 3 PUSCH transmission and is configured, after RRC connection establishment, to use the second DMRS for PUSCH transmission, by RRC signaling, the UE may transmit the second DMRS in the PUSCH transmission. In a case that the UE supporting the second reference signal sequence transmits the second DMRS in Msg. 3 PUSCH transmission and is not configured, after RRC connection establishment, to use the second DMRS for PUSCH transmission, by RRC signaling, the UE may transmit the first DMRS in the PUSCH transmission.

In this way, by transmitting the second DMRS before RRC connection establishment, the coverage can be improved.

Embodiment 5

The UE may apply $\pi/2$-BPSK modulation for PUCCH format 1.

The UE may be configured, after RRC connection establishment, whether or not to apply $\pi/2$-BPSK modulation for PUCCH format 1, by RRC signaling. For example, a PUCCH resource configuration (PUCCH-Resource) in the RRC signaling may include information indicating to apply $\pi/2$-BPSK.

The UE configured to apply $\pi/2$-BPSK for PUCCH format 1 may transmit the second DMRS in PUCCH transmission.

The UE configured to apply $\pi/2$-BPSK for PUCCH format 1 may apply $\pi/2$-BPSK for UCI in data symbols in PUCCH format 1 and apply $\pi/2$-BPSK for a DMRS in DMRS symbols in PUCCH format 1 (may transmit the second DMRS in DMRS symbols).

Figure 8:
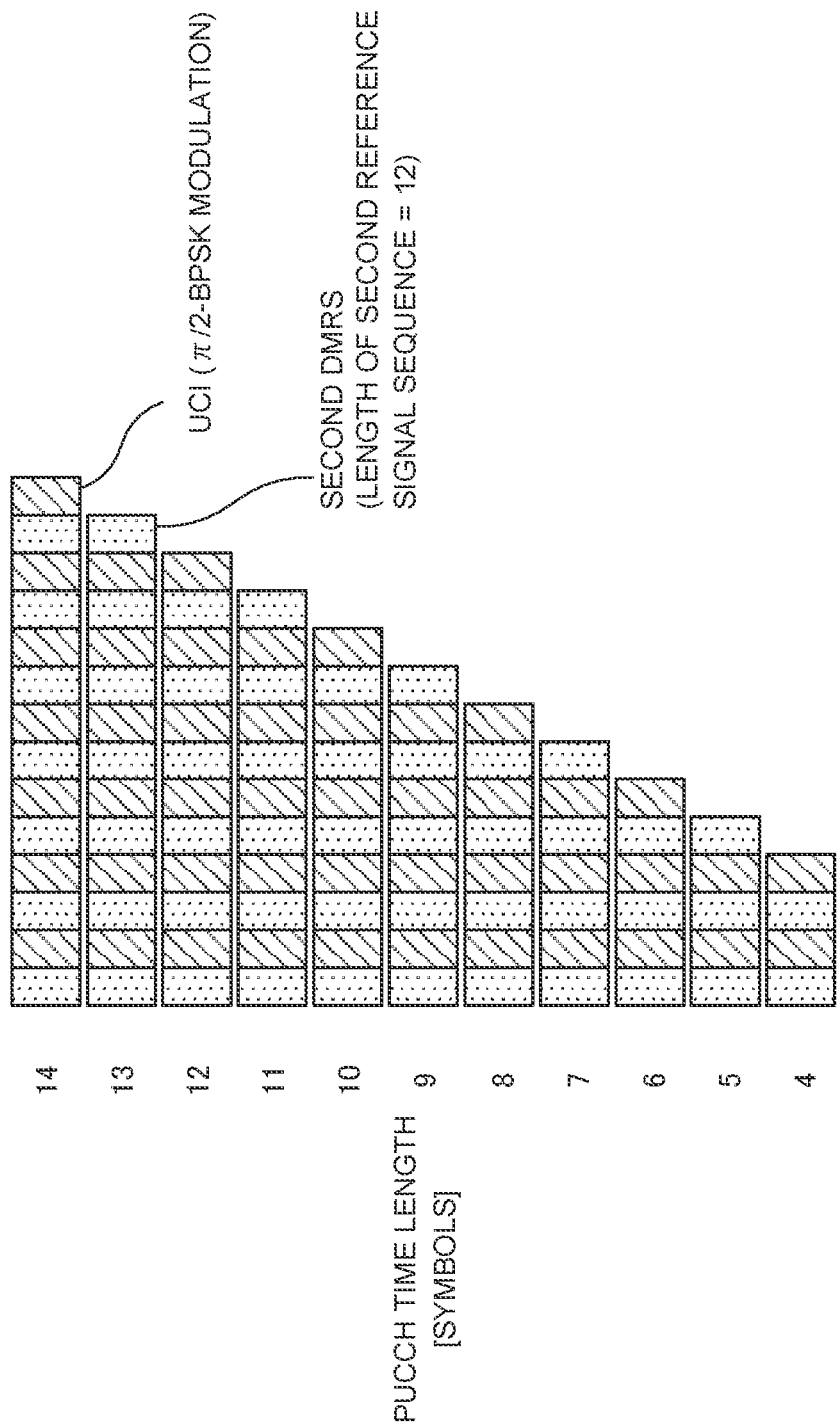
FIG. 8 is a diagram to show an example of mapping of data symbols and DMRS symbols for each PUCCH time length in PUCCH format 1.

FIG. 8 is a diagram to show an example of mapping of data symbols and DMRS symbols for each PUCCH time length (4 to 14 symbols) in PUCCH format 1. Symbols having even-numbered symbol indices (0, 2, . . . ) in a PUCCH may be DMRS symbols, and symbols having odd-numbered symbol indices (1, 3, . . . ) in the PUCCH may be data symbols. The bandwidth in PUCCH format 1 may correspond to one physical resource block (PRB) (12 subcarriers). The length of the second reference signal sequence used for the second DMRS may be 12.

The UE configured to apply $\pi/2$-BPSK for PUCCH format 1 may apply time domain OCC for PUCCH format 1. By applying time domain OCC for PUCCH format 1, PUCCH formats 1 of a plurality of UEs may be multiplexed in the same time resource and the same frequency resource.

As shown in FIG. 9, the multiplexing capacity of time domain OCC may be determined depending on whether or not frequency hopping is applied for PUCCH format 1.

In this way, by applying at least one of $\pi/2$-BPSK modulation and the second DMRS for a PUCCH after RRC connection establishment, the quality of the PUCCH can be improved.

In Embodiment 4, transmitting the second DMRS in Msg. 3 PUSCH transmission may be interpreted as applying $\pi/2$-BPSK modulation. The UE may be indicated to apply $\pi/2$-BPSK modulation before RRC connection establishment by the method of Embodiment 4.

The UE indicated to apply $\pi/2$-BPSK modulation before RRC connection establishment by the method of Embodiment 4 (applying $\pi/2$-BPSK modulation for data symbols in a Msg. 3 PUSCH) may apply $\pi/2$-BPSK for a PUCCH (PUCCH format 1). The UE indicated to apply $\pi/2$-BPSK modulation before RRC connection establishment by the method of Embodiment 4 (applying $\pi/2$-BPSK modulation for the data symbols in the Msg. 3 PUSCH) may apply $\pi/2$-BPSK modulation for DMRS symbols (may transmit the second DMRS) in a PUCCH (PUCCH format 1).

The PUCCH may be Msg. 4 HARQ-ACK (HARQ-ACK for Msg. 4).

In this way, by employing at least one of $\pi/2$-BPSK modulation and the second DMRS for a PUCCH before RRC connection establishment, the coverage can be expanded.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
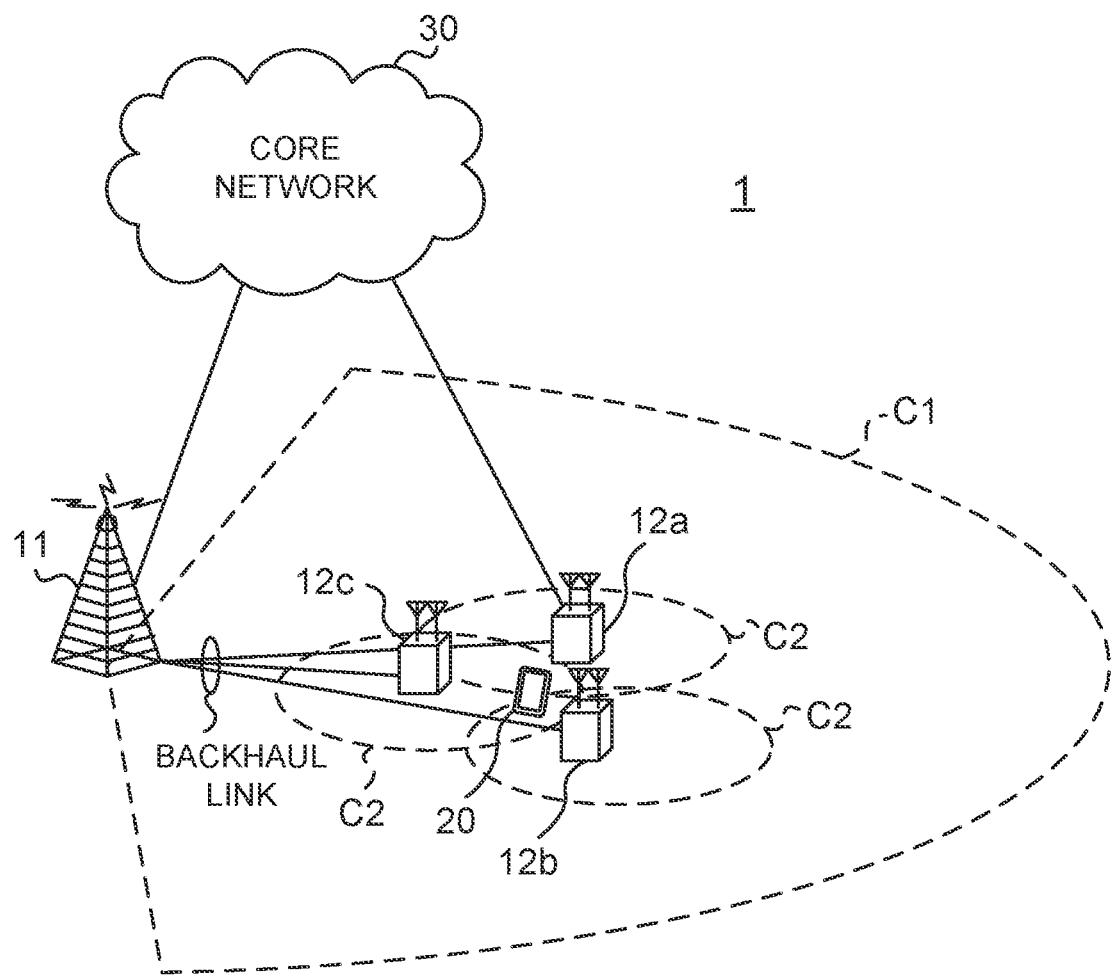
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are transmitted on the PDSCH. User data, higher layer control information and so on may be transmitted on the PUSCH. The Master Information Blocks (MIBs) may be transmitted on the PBCH.

Lower layer control information may be transmitted on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be transmitted by means of the PUCCH. By means of the PRACH, random access preambles for establishing connections with cells may be transmitted.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be transmitted. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be transmitted as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be transmitted as an uplink reference signal (UL-RS). Note that DMRS may be referred to as a "user terminal specific reference signal (UE-specific Reference Signal)."

(Base Station)

Figure 11:
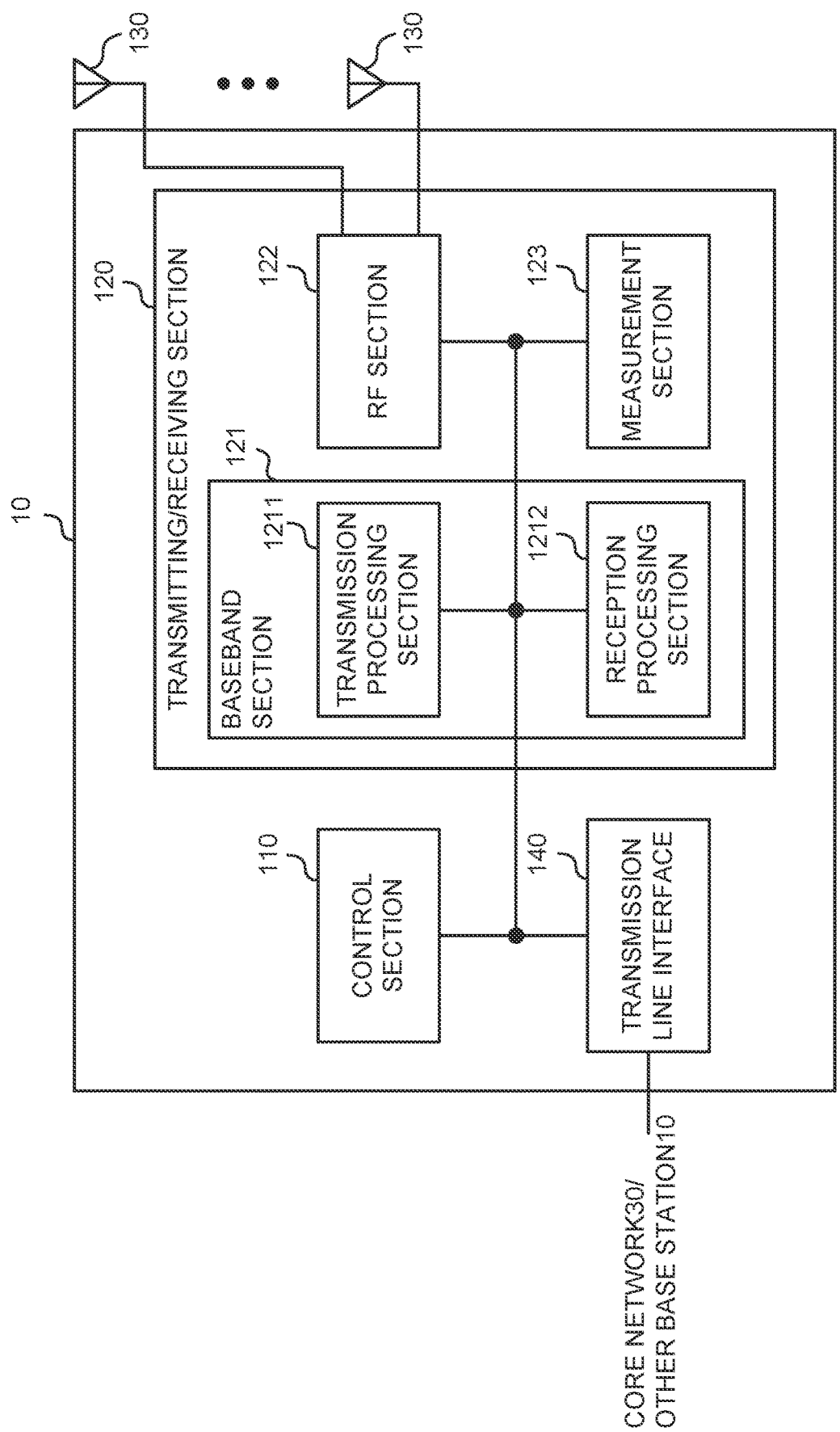
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RUM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the transmitting/receiving section 120 may transmit a reference signal (for example, an SSB, a CSI-RS, or the like). The transmitting/receiving section 120 may transmit information (MAC CE or DCI) indicating a TCI state for a particular DL channel.

(User Terminal)

Figure 12:
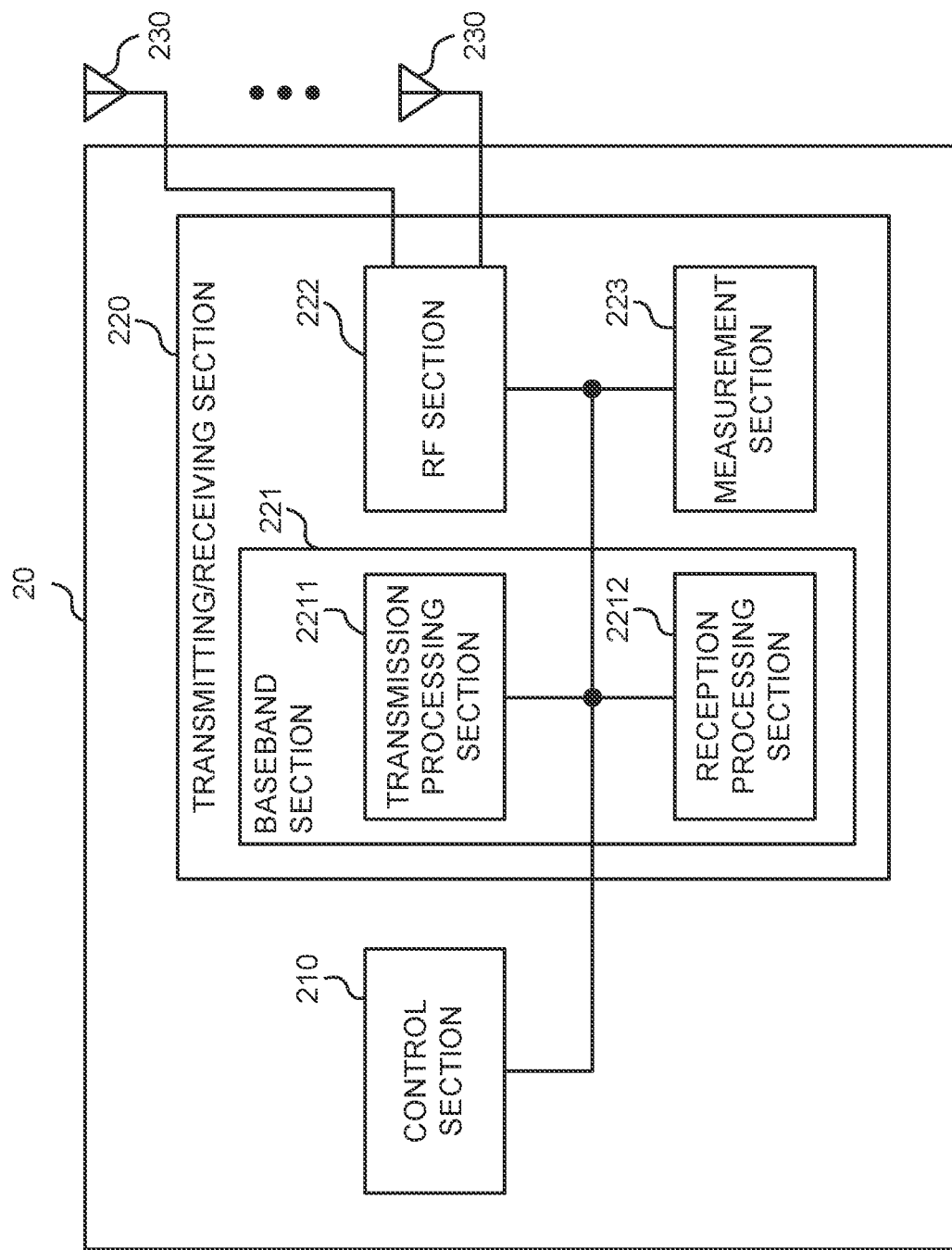
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be constituted as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (the RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (the RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (the measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may transmit a demodulation reference signal (DMRS) (second DMRS or second reference signal sequence) based on $\pi/2$-BPSK modulation in uplink transmission of at least one of an uplink shared channel (PUSCH) and an uplink control channel (PUCCH), before radio resource control (RRC) connection establishment. The control section 210 may perform the RRC connection establishment (for example, a random access procedure), based on the uplink transmission.

The transmitting/receiving section 220 may transmit the DMRS in transmission of an uplink shared channel (for example, Msg. 3) scheduled by a random access response (Embodiment 4).

The transmitting/receiving section 220 may transmit a random access channel (for example, Msg. 1) by using a random access channel resource corresponding to supporting the DMRS (Embodiment 4).

After the RRC connection establishment, the transmitting/receiving section 220 may transmit capability information related to the DMRS (Embodiment 3).

After the RRC connection establishment, in a case of being configured to apply π/2-BPSK modulation for a first channel of an uplink shared channel and an uplink control channel, the transmitting/receiving section 220 may transmit the DMRS in transmission of a second channel of an uplink shared channel and an uplink control channel (Embodiment 3).

In a case of being configured to employ π/2-BPSK modulation for an uplink shared channel, the transmitting/receiving section 220 may transmit a DMRS based on π/2-BPSK modulation in an uplink control channel (Embodiment 5).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
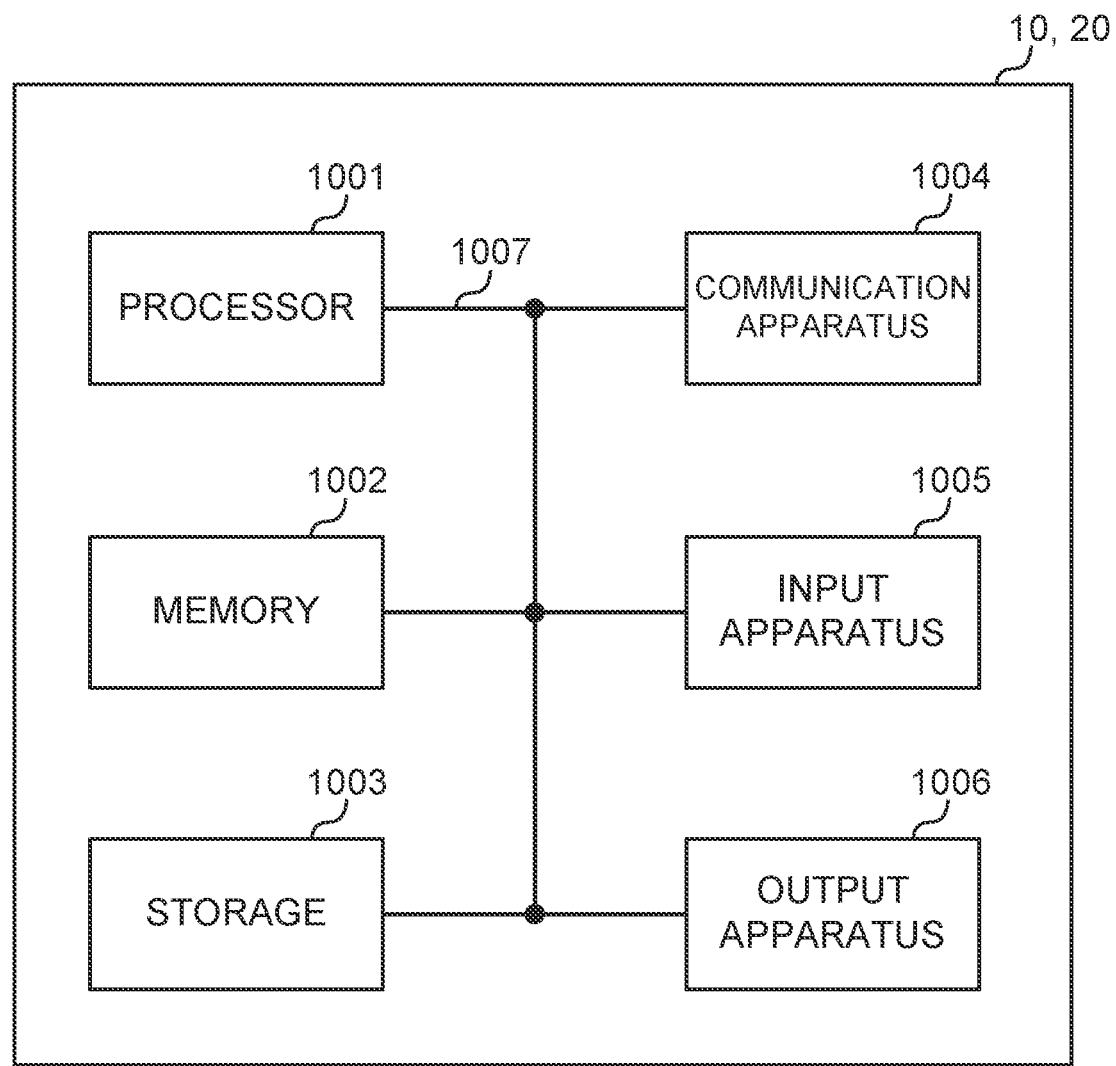
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120

(220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be indicated by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding wait)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation.

The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a processor that controls transmission of a report of capability information and a reception of configuration information of $\pi/2$-BPSK modulation; and
   a transmitter that transmits, based on the capability information and the configuration information, a demodulation reference signal (DMRS) in uplink transmission of at least one of a physical uplink control channel (PUCCH) and a physical uplink shared channel (PUSCH),
   wherein when the capability information indicates support of $\pi/2$-BPSK modulation for the DMRS in the uplink transmission and the configuration information indicates application of the $\pi/2$-BPSK modulation for the uplink transmission and application of Discrete Fourier Transform—spread—Orthogonal Frequency Division Multiplexing (DFT-s-OFDM) for the uplink transmission, the transmitter transmits the DMRS for which the $\pi/2$-BPSK modulation is applied in the uplink transmission.

2. The terminal according to claim 1, wherein when the capability information indicates support of the $\pi/2$-BPSK modulation for the DMRS for the PUSCH and the configuration information indicates application of the $\pi/2$-BPSK modulation for the PUCCH and application of the DFT-s-OFDM for the PUSCH, the transmitter transmits the DMRS for which the $\pi/2$-BPSK modulation is applied in the PUSCH.

3. The terminal according to claim 1, wherein when the capability information indicates support of the $\pi/2$-BPSK modulation for the DMRS for the PUCCH and the configuration information indicates application of the $\pi/2$-BPSK modulation for the PUCCH and application of the DFT-s-OFDM for the PUCCH, the transmitter transmits the DMRS for which the $\pi/2$-BPSK modulation is applied in the PUSCH.

4. A radio communication method for a terminal, comprising:
   controlling transmission of a report of capability information and a reception of configuration information of $\pi/2$-BPSK modulation; and
   transmitting, based on the capability information and the configuration information, a demodulation reference signal (DMRS) in uplink transmission of at least one of a physical uplink control channel (PUCCH) and a physical uplink shared channel (PUSCH),
   wherein when the capability information indicates support of $\pi/2$-BPSK modulation for the DMRS in the uplink transmission and the configuration information indicates application of the $\pi/2$-BPSK modulation for the uplink transmission and application of Discrete Fourier Transform—spread—Orthogonal Frequency Division Multiplexing (DFT-s-OFDM) for the uplink transmission, transmitting the DMRS for which the $\pi/2$-BPSK modulation is applied is transmitted in the uplink transmission.

5. A base station comprising:
   a processor that controls reception of a report of capability information and a transmission of configuration information of $\pi/2$-BPSK modulation; and
   a receiver that receives the a demodulation reference signal (DMRS) which is transmitted based on the capability information and the configuration information, in uplink transmission of at least one of a physical uplink control channel (PUCCH) and a physical uplink shared channel (PUSCH),
   wherein when the capability information indicates support of $\pi/2$-BPSK modulation for the DMRS in the uplink transmission and the configuration information indicates application of the $\pi/2$-BPSK modulation for the uplink transmission and application of Discrete Fourier Transform—spread—Orthogonal Frequency Division Multiplexing (DFT-s-OFDM) for the uplink transmission, the receiver receives the DMRS for which the $\pi/2$-BPSK modulation is applied in the uplink transmission.

6. A system comprising a terminal and a base station, wherein
   the terminal comprises:
      a processor that controls transmission of a report of capability information and a reception of configuration information of $\pi/2$-BPSK modulation; and
      a transmitter that transmits, based on the capability information and the configuration information, a demodulation reference signal (DMRS) in uplink transmission of at least one of a physical uplink control channel (PUCCH) and a physical uplink shared channel (PUSCH),
      wherein when the capability information indicates support of $\pi/2$-BPSK modulation for the DMRS in the uplink transmission and the configuration information indicates application of the $\pi/2$-BPSK modulation for the uplink transmission and application of Discrete Fourier Transform—spread—Orthogonal Frequency Division Multiplexing (DFT-s-OFDM) for the uplink transmission, the transmitter transmits the DMRS for which the $\pi/2$-BPSK modulation is applied in the uplink transmission, and the base station comprises:
  a processor that controls a transmission of the configuration information; and
  a receiver that receives the DMRS.

* * * * *